April 26, 1966 D. E. QUINLAN 3,248,567

SELECTIVELY SHUNTED SERIES-SWITCHING TRANSMISSION GATES

Filed March 8, 1963

INVENTOR.
DONALD E. QUINLAN
BY
[signature]
ATTORNEY

United States Patent Office 3,248,567
Patented Apr. 26, 1966

3,248,567

SELECTIVELY SHUNTED SERIES-SWITCHING TRANSMISSION GATES

Donald E. Quinlan, Lincoln Park, N.J., assignor to Visual Electronics Corporation, a corporation of New York Filed Mar. 8, 1963, Ser. No. 263,814
5 Claims. (Cl. 307—88.5)

Figure 1:
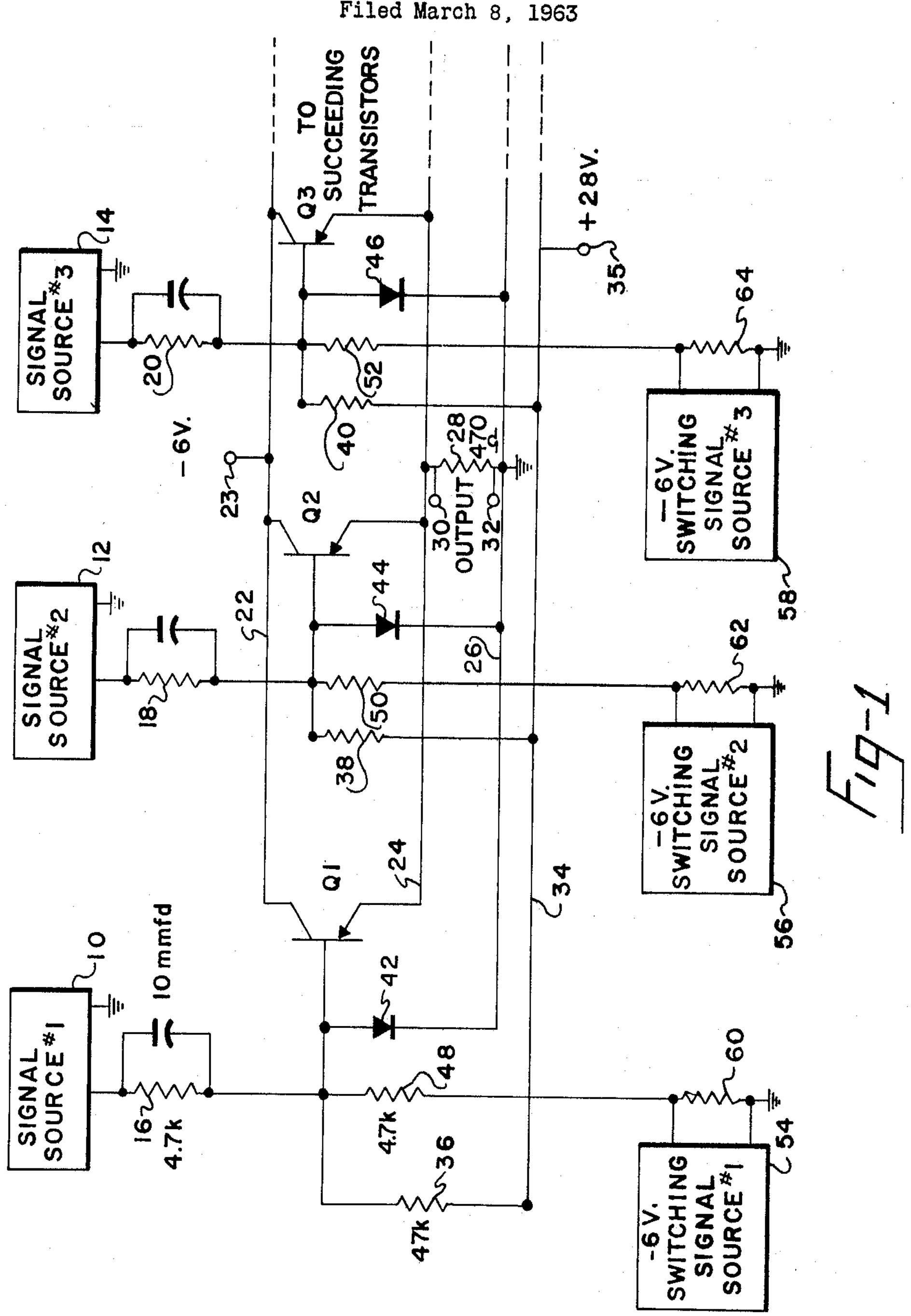

This invention relates to switching apparatus, and more particularly to multiple switching circuits wherein electronic On-Off switches serve to transmit selectively a plurality of input signals to a common output load.

In electronic switching apparatus of the type wherein an electronic valve circuit serves as a switch for connecting an input signal to an output line or load, it is difficult to insure, when a plurality of such switching circuits are connected to a common load, that no signal component is transmitted to the common load by a switching circuit when in the Off condition. When each electronic switch includes a single transistor and it is desired to use a plurality of such transistor switches to selectively switch discrete signals, "cross-talk" on the output line generally results due to the fact that a transistor, when rendered non-conductive or turned Off may yet transmit undesired leakage current to the load, to appear thereacross as an unwanted input signal component of relatively small magnitude.

This problem is particularly acute in video switching systems, when it is desired to sequentially switch to a common output line, video information signals originating from discrete sources such as individual video cameras. Such signals usually have a frequency in the order of 3.5 mc. If the switching circuits are to be simple and use a minimum number of components, then a single electron discharge device per switch is generally unsuited for such applications, due to signal leakage through the interelectrode capacitances of the discharge device.

Thus, in video switching applications, diode matrices have generally been used as switching elements instead of transistors or electron discharge devices. However, diode matrices have the disadvantage of producing large changes in input impedance when switched between On and Off states. Furthermore, in order to effectively switch such matrices, especially when a large amount of interconnecting diodes are involved, the current necessary to perform the switching function tends to become excessively high. But the requirement for auxiliary components to provide high switching currents results in an undesired increase in switching time due to the nature and size of the components necessary for satisfactory high current switching.

It is therefore an object of the invention to provide multiple switching apparatus for selectively connecting a plurality of input signals to a common output line and having a minimum amount of undesired signal leakage to the output line from unconnected input signal sources.

It is another object of the invention to provide a semiconductor switching arrangement in which variations in the leakage resistance through the semi-conductor are rendered ineffective relative to the desired signal applied to an output line.

It is a further object of the invention to provide a multiple switching circuit using single transistor switches for connecting one of a plurality of input signals to an output load, in which there is substantially no change in input impedance whether such switches are in an On or Off condition.

It is yet another object of the invention to provide a high speed, multiple switching circuit using single semiconductor switches for connecting a selected input signal to a common output line, in which the required switching current and input bus loading is kept to a minimum.

In accordance with the broader aspects of the invention, a plurality of signal sources are each selectively connected to a common load by means of a separate switching circuit for each source. Each circuit includes electronic valve means having a discrete input, and an output connected to a common load. An asymmetric impedance is connected in shunt with each input and a common biasing source for each circuit is provided, which has a polarity effective to aid in biasing each valve means in an Off state and also forward bias each asymmetric impedance into a low impedance state to substantially short circuit the input to each electronic valve means.

A discrete switching signal means for each switching circuit is provided having a polarity and magnitude effective, when actuated, to bias its associated electronic valve means into an On state, and to back bias the associated asymmetric impedance into a high impedance state to remove the input short and allow a signal from the associated input signal source to be transmitted to the common output load. Means are also provided for applying the voltage developed across the common load by the On circuit to the other circuits in a manner effective to aid in biasing them into the Off state. Accordingly, the need for high current consuming switching devices is eliminated by the present invention and the input and output double "closed gate" feature reduces output cross-talk to a minimum.

The features of this invention, which are believed to be novel, are set forth with particularity in the appended claims. The invention, together with further objects and advantages thereof, may be best understood, however, by reference to the following description taken in conjunction with the accompanying drawing. The drawing merely shows, and the description merely describes, a preferred embodiment of the present invention which is given by way of illustration or example.

The drawing is a schematic circuit diagram of the preferred embodiment of the multiple switching apparatus of the present invention. While only three signal sources and associated switching circuits are shown and described herein for the sake of brevity, yet the present invention is not limited to three in number, and it is understood that more or less than three such sources and circuits may be used.

Referring now to the drawing, a plurality of signal sources #1, #2, #3, generally indicated as 10, 12, 14, are provided, which may be, for example, television picture camera signals or other sources of video information signals having a frequency in the order of 3.5 mc. However, signals as high as 20 mc. may be suitably switched by the apparatus of the present invention. These signal sources are each connected through associated resistors 16, 18, 20 to the bases of transistors Q1, Q2, Q3. The collectors of transistors Q1, Q2, Q3 are commonly connected to a bus line 22 which is in turn connected via terminal 23 to a suitable source of D.C. potential. Likewise, the emitters of transistors Q1, Q2, Q3 are commonly connected to a bus line 24, which in turn is connected to ground line 26 through a common output load resistor 28. The output signal accordingly appears across output terminals 30, 32.

Pnp junction transistors are shown in the drawing. However, it should be understood that other types of transistors can be used in the circuits of the invention, it merely being necessary to select the proper polarity and magnitudes of the operating voltages, depending upon the characteristics of the particular transistor selected. For example, transistors Q1, Q2, Q3 may be types 2N1301 and a suitable operating voltage for collector bus line 22 is minus 6 volts.

The base of each transistor Q1, Q2, Q3 is also connected to a common bus line 34 through associated resistors 36, 38 and 40. Bus line 34 is connected via terminal 35 to a source of positive "turn-off" voltage which, in a practical example of the circuit shown in the drawing, may be 28 volts. Connected between each base electrode and ground line 26 are diodes 42, 44 and 46.

Also connected to each base of transistors Q1, Q2, Q3, via resistors 48, 50, 52, are switching signal sources #1, #2, #3 designated by reference numerals 54, 56 and 58. In order to provide a return path to ground, each switching signal source is illustrated as having an output resistor 60, 62, 64 connected across its respective output terminals. However, whether or not resistors 60, 62, 64 are necessary will depend upon the nature of the switching signal sources 54, 56, 58. The only requirement for each source is that it be capable of providing a negative voltage of sufficient magnitude to bias its associated pnp transistor in an On condition. For example, in the practical embodiment of the circuit shown in the drawing, any signal source capable of providing minus 6 volts to the base of each transistor is suitable for switching it to an On state. Such a signal source may be a bistable multivibrator switching system of the type shown and described in detail in Donald E. Quinlan, S.N. 260,387, filed February 25, 1963, entitled, Electronic Switch. Switching signal sources 54, 56, 58 also may be batteries of the proper voltage, in which case resistors 60, 62, 64 would not be used. Switching signal sources 54, 56, 58 may also be provided with suitably interlocked relays or electromechanical switches connected to a single common source of proper bias voltage. In any event, regardless of the nature of the switching sources, it is essential for proper operation of the invention, that the sources be interlocked so that only one at a time is in an On condition to provide a negative bias voltage to one of transistors Q1, Q2, Q3. As such interlocking circuitry is conventional, it has been omitted from the drawing for the sake of brevity, satisfactory showings of such circuitry being included in prior art Patent 3,095,509 to Hileman, Patent 3,135,874 to Lucas, and others.

The operation of the switching circuits of the present invention will now be described. Assume that initially transistor Q1 is in an On condition so that signals from signal source #1 appear across output terminals 30, 32, and transistors Q2 and Q3 are in an Off condition. Under these circumstances, a switching signal will be provided from switching signal source 54, for example minus 6 volts, which is effective to bias transistor Q1 into its On state. The resistance ratio between resistors 36 and 48 is adjusted so that the greatest proportion of the voltage drop as measured between the positive voltage supplied to terminal 35 and the negative voltage supplied by switching signal source 54, is developed across resistor 36 with the result that a negative bias voltage will appear at the base of transistor Q1 of sufficient magnitude to cause it to turn On. Thus, if resistor 36 is approximately 47 kilohms and resistor 48 is 4.7 kilohms, then substantially minus 3 volts will be developed across resistor 48 when switching signal source 54 is in an On condition.

Application of a negative voltage to the base of transistor Q1 back biases diode 42 and places it in a non-conducting or high resistance state. Thus, any signal supplied by signal source 10 will be conducted through transistor Q1 and will appear across output terminals 30, 32.

When switching signal source 54 is in an On condition, switching signal sources 56 and 58 are in an Off condition. Thus, no negative bias voltage is developed across resistor 62, 64 respectively with the result that almost the full positive voltage applied to line 34 appears across diodes 44 and 46 respectively. These diodes are immediately placed in a conductive state and act to clamp the bases of transistors Q2 and Q3 to ground through their relatively low forward resistances. Any signals from signal sources 12 and 14 are thus shunted effectively to ground.

Transistors Q2 and Q3 are further biased into an Off condition by the positive voltage developed across the common emitter-to-ground resistor 28 by the current flowing therethrough from On transistor Q1. Thus, in accordance with the present invention, isolation of unwanted signals is doubly provided. Such signals are, firstly, prevented from appearing across output terminals 30 and 32 by the short circuited input feature and, secondly, by the common Off biasing voltage feature provided by the On transistor.

The resistance value of each resistor 16, 18, 20 is preferably of a relatively high value with respect to the forward resistance of diodes 42, 44, 46 or the base-to-emitter resistance of transistors Q1, Q2, Q3. A suitable range of values for resistors 16, 18, 20 is in the order of magnitude of resistors 48, 50, 52. Thus, the output impedance of signal sources 10, 12, 14 is maintained substantially constant whether transistors Q1, Q2, Q3 are On or Off since isolating resistors 16, 18 and 20 always look into either the low forward impedance of diodes 42, 44, 46 or the low base-to-emitter resistance of transistors Q1, Q2 and Q3.

In the practical embodiment of the invention shown in the drawing, the double "cross-talk" protection feature of the invention reduces the leakage signal which may appear at output terminals 30, 32 to approximately 1/500 of the magnitude of the signal from the original signal source. Inasmuch as the forward resistance of each of diodes 42, 44, 46 when conducting is in the order of approximately 100 ohms and isolation resistors 16, 18, 20 are each substantially 5 kilohms, the signal appearing at the base of any of the transistors when in an Off condition is approximately 1/50 of the original signal developed by one of signal sources 10, 12, 14. This signal is further attenuated by the base-to-emitter resistance of an Off transistor Q1, Q2, Q3, by a factor of 10, due to the reverse bias applied thereto from the voltage developed across resistor 28 by a transistor in the On condition. The resulting leakage signal is therefore less than 1/500 of the magnitude of the input signal.

When it is desired to transmit signals from one of the other signal sources, it is only necessary to place the corresponding switching signal source, for example 56 or 58, in an On condition and switching signal source 54 in an Off condition, to cause transistor Q1 to be turned Off and the desired other transistor Q2 or Q3 to be turned On. The operation described above will then be obtained for transistor Q1 and signal source 10 with signals applied to the On transistor appearing across output terminals 30, 32.

The invention hereinabove described may therefore be varied in construction with the scope of the claims, for the particular device selected to illustrate the invention is but one of many possible embodiments of the same. The invention, therefore, is not to be restricted to the precise details of the structure shown and described.

I claim:

1. A switching system for connecting a plurality of discrete input signals to a common output load comprising, a plurality of discrete input signal sources, a common output load, individual switching circuits connected between each signal source and said common output load for selectively switching said input signals to said output load, each of said switching circuits including electronic valve means having an input connected to one of said signal sources and an output connected to said common load, said valve means being rendered conductive by bias of one polarity at its input but non-conductive by bias of the opposite polarity thereat, asymmetric impedance means each having a low and a high impedance state and connected in shunt with each of said valve inputs in such a way that said means exhibit high importance when the input has said one polarity and low impedance when said input has said opposite polarity, common biasing means connected to the input of each switching circuit and having said opposite polarity effective to forward bias each of said asymmetric impedances into a low impedance state to normally substantially short circuit the input of each electronic valve means, and discrete switching means for each of said switching circuits connected to said input of a corresponding electronic valve means and operative when actuated to bias its associated electronic valve input with said one polarity to render it conductive and back bias the associated asymmetric impedance into a high impedance state to removed said input short, whereby said signal from said associated input signal source is transmitted to said output load by said associated electronic valve means.

2. A switching system for connecting a plurality of discrete input signals to a common output load comprising, a plurality of discrete input signal sources, a common output load, individual switching circuits connected between each signal source and said common output load for selectively switching said input signals to said output load, each of said switching circuits including electronic valve means having an input connected to one of said signal sources and an output connected to said common load, said valve means being rendered conductive by bias of one polarity at its input but non-conductive by bias of the opposite polarity thereat, asymmetric impedance means each having a low and a high impedance state and connected in shunt with each of said valve inputs in such a way that said means exhibit high impedance when the input has said one polarity and low impedance when said input has said opposite polarity, common biasing means connected to the input of each switching circuit and having said opposite polarity effective to forward bias each of said asymmetric impedances into a low impedance state to normally substantially short circuit the input of each electronic valve means, discrete switching means for each of said switching circuits connected to said input of a corresponding electronic valve means and operative when actuated to bias its assoicated electronic valve input with said one polarity to render it conductive and back bias the associated asymmetric impedance into a high impedance state to remove said input short, whereby said signal from said associated input signal source is transmitted to said output load by said associated electronic valve means, and means operative in response to the forward biasing of the valve means of one of said switching circuits for biasing the valve means of the remainder of said switching circuits into an Off state.

3. A switching system for connecting a plurality of discrete input signals to a common output load comprising, a plurality of discrete input signal sources, a common output load, individual switching circuits connected between each signal source and said common output load for selectively switching said input signals to said output load, each of said switching circuits including electronic valve means having an input connected to one of said signal sources and an output connected to said common load, said valve means being rendered conductive by bias of one polarity at its input but non-conductive by bias of the opposite polarity thereat, gating means connected in shunt with the input of each of said electronic valve means and operative when biased with said opposite polarity to short circuit input signals to the inputs of associated electronic valves, biasing means connected to said gating means and to said inputs and having said opposite polarity for maintaining said gates in a normally short-circuiting condition, discrete switching means associated with each of said switching circuits and connected to said input of a corresponding electronic valve means, each discrete switching means being operative when actuated to deliver a bias of said one polarity to override said biasing means for that corresponding electronic valve means only and disable the gating means associated therewith to remove the short-circuit from the input signal of said corresponding electronic valve means and to enable said valve means to transmit said signal to said output load, and means operative in response to the forward biasing of the valve means of the selected input and to the resulting signal across said output load for biasing the electronic valve means of the remainder of said switching circuits into an Off state.

4. A switching system for connecting a plurality of discrete input signals to a common output load comprising, a plurality of discrete input signal sources, a common output load, individual switching circuits connected between each signal source and said common output load for selectively switching said input signals to said output load, each of said switching circuits including a transistor having a base input circuit connected to one of said signal sources and an emitter connected to said common load so that the emitter current of each transistor when in an On state flows through said load, said transistor being rendered conductive by bias of one polarity at its base but non-conductive by bias of the opposite polarity thereat, asymmetric impedance means each having a low and a high impedance state and connected in shunt with the base input circuit of each of said transistors in such a way that said means exhibit high impedance when the input has said one polarity and low impedance when said input has said opposite polarity, common biasing means connected to each of said base input circuits and having said opposite polarity effective to forward bias all of said asymmetric impedances into a low impedance state to normally substantially short circuit said base input circuits, and discrete switching means for each of said switching circuits connected to the base circuit of a correspondingly associated transistor and operative when actuated to apply bias of said one polarity effective to override said forward bias and bias said transistor into an On state and back bias the asymmetric impedance associated therewith into a high impedance state to remove said base circuit short and allow signals from said associated signal source to be transmitted to said load by said On transistor, the emitter current from said On transistor flowing in said common load being operative to generate a signal for biasing the transistors of the remainder of said switching circuits into an Off condition.

5. The invention defined in claim 4 wherein said asymmetric impedance has a resistance value when conducting substantially the same as the base-to-emitter resistance value of said associated transistor when conducting, whereby the input impedance of each of said base circuits, whether said associated transistor is Off or On, remains substantially constant.

References Cited by the Examiner

UNITED STATES PATENTS

| | | | |
|---|---|---|---|
| 2,676,271 | 4/1954 | Baldwin. | |
| 2,918,576 | 11/1956 | Munch | 84—1.26 X |
| 2,939,018 | 5/1960 | Faulkner. | |
| 3,095,509 | 6/1963 | Hileman et al. | 328—71 X |
| 3,112,353 | 11/1963 | Campbell | 84—1.26 |
| 3,135,874 | 6/1964 | Lucas et al. | 328—79 X |
| 3,152,319 | 10/1964 | Gordon et al. | |
| 3,153,729 | 10/1964 | Leakey. | |

OTHER REFERENCES

Pressman, Design of Transistorized Circuits for Digital Computers, Rider Inc., New York, 1959 (pages 3–45 through 3–47 relied on).

Comer, High Voltage Pulse Gating Circuit, IBM Technical Disclosure Bulletin, vol. 6, Nov. 5, October 1963.

Millman & Taub, Pulse and Digital Circuits, McGraw-Hill 1956, pages 429–432 relied on.

ARTHUR GAUSS, *Primary Examiner.*

I. C. EDELL, *Assistant Examiner.*